United States Patent Office 3,254,152
Patented May 31, 1966

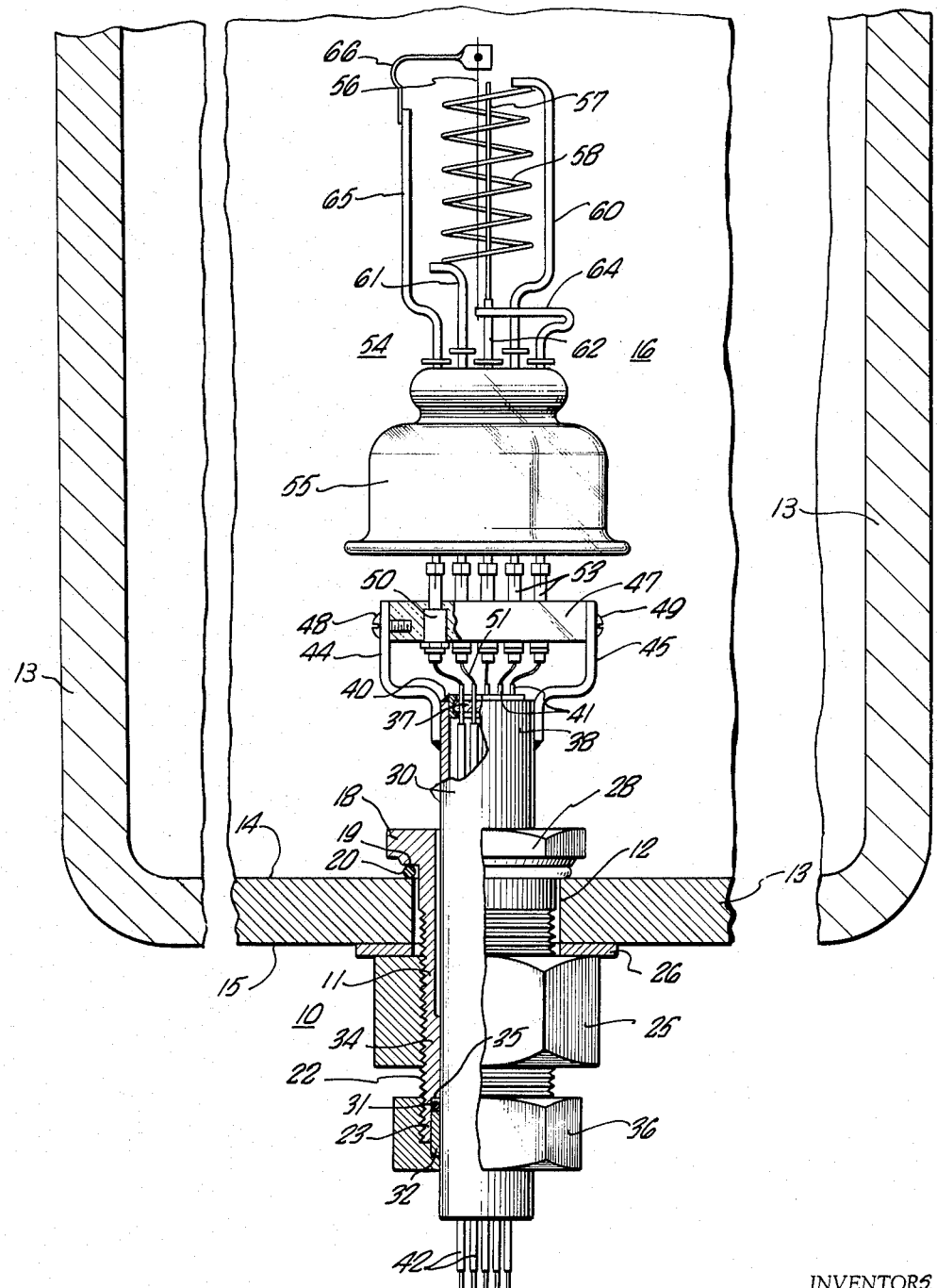

3,254,152
VACUUM APPARATUS
William E. Finney, Webster, and Roy C. Gauger and Edward W. Perkins, Rochester, N.Y., assignors to Consolidated Vacuum Corporation, Rochester, N.Y., a corporation of New York
Filed Oct. 17, 1963, Ser. No. 316,841
16 Claims. (Cl. 174—52)

The present invention relates to vacuum apparatus and, more particularly, to structures for mounting vacuum gauges.

Gauges for measuring vacua are well known. A large number of these gauges are provided with their own enclosures that are connected through glass tubulations to the vacuum systems to be subjected to measurement. At higher vacua, these gauges frequently fail to provide the required measuring accuracy and speed of response, since the glass tubulations impede the flow of gas molecules. In addition, the enclosed gauge elements are not easily outgassed, and undesirable ion pumping effects of the gauge are more noticeable if the gauge elements are in a separate envelope.

To overcome these disadvantages, gauge mounting structures have been built which mount the gauge elements freely exposed inside the vacuum vessel to be subjected to measurement. These structures have been found effective to overcome many of the disadvantages of enclosed gauges.

However, there still exists a need for a mounting structure that permits an improved adjustability of the position of the gauge inside the vacuum vessel.

The subject invention provides such a mounting structure. The mounting structure or assembly according to the invention comprises a mounting sleeve having a first end and a second end and an external thread extending to the first end. The mounting assembly includes a tube which is longitudinally slidable in the mounting sleeve, and which has a first end located outwardly beyond the first end of the mounting sleeve and a second end located outwardly beyond the second end of the sleeve. Compressible sealing means are located between the mounting sleeve and the slidable tube. A threaded nut is disposed on the first end of the mounting sleeve in engagement with the external thread. This nut serves to compress the sealing means between the mounting sleeve and the above-mentioned tube. The tube itself is hermetically closed. A mounting block for the vacuum gauge is connected to the second free end of the tube.

The invention will be more readily apparent from the following detailed description of a preferred embodiment thereof, illustrated by way of example in the accompanying drawing which shows an elevational view, partially in section, of a gauge mounting assembly of the invention, together with associated parts.

The illustrated mounting assembly 10 includes a mounting sleeve 11 which extends through an opening 12 in a vacuum enclosure 13. The vacuum enclosure 13 has an inside surface 14, an outside surface 15, and forms part of a vacuum vessel (not shown) that confines an evacuated space 16. The mounting sleeve 11 has a rim 18 at one end thereof. Rim 18 defines a sealing surface 19 which faces the inner enclosure surface 14. A sealing ring is interposed between enclosure surface 14 and sealing surface 19. The sleeve 11 has an external thread 22 that extends to the free end 23 of the sleeve. A hexagonal nut 25 is in engagement with external thread 22 and is positioned outside the enclosure surface 15. A washer 26 is interposed between nut 25 and enclosure 13. The nut 25 is tightened until the ring 20 establishes a firm hermetic seal between sleeve rim 18 and enclosure 13. This tightening of nut 25 is facilitated by providing rim 18 with peripheral faces 28 permitting the employment of a wrench or key for holding the mounting sleeve 11 in position while the nut 25 is tightened.

It would, of course, be possible to dispense with sealing ring 20, nut 25 and washer 26 and to weld sleeve 11 or its rim 18 directly to enclosure 13, unless removability of the mounting sleeve 11 is desired, or unless it is preferred that the mounting sleeve 11 be positioned in place without the use of welding operations.

A tube 30 is slidably and rotatably disposed in mounting sleeve 11. A sealing ring 31 and an annular sealing body 32 are located between sleeve 11 and tube 30. The sleeve 11 has an internal annular projection 34 which defines a shoulder 35 adjacent tube 30. A nut 36 is threaded on the free end 23 of sleeve 11 and serves to compress annular sealing body 32 into intimate contact with sleeve 11 and tube 30 and sealing ring 31 into sealing contact with sleeve shoulder 35. A vacuum tight terminal disc 37 is positioned at free end 38 of tube 30 and is mounted and hermetically sealed to tube 30 by a sealing compound 40. The terminal disc 37 has a plurality of electrical terminals 41 extending therethrough. A plurality of electric leads 42 extend through tube 30 and are electrically connected to terminals 41.

A pair of brackets 44 and 45 are connected to the free end 38 of tube 30, such as by means of welding. A mounting block 47 is connected to the brackets 44 and 45 by a pair of screws 48 and 49. These screws are aligned along an axis which extends at right angles to the longitudinal axis of tube 30. In this manner, the mounting block 47 may be pivoted or swivelled with respect to tube 30.

Mounting block 47 carries a plurality of plug-in or female terminals 50 which are electrically connected to the terminals 41 in disc 37 by leads 51. The plug-in terminals 50 are positioned and dimensioned to receive terminal pins 53 of a vacuum gauge 54. This gauge is of the ionization vacuum gauge type and includes a glass foot 55, a filament 56, a collector electrode 57 and a helical grid 58. Grid 58 is mounted by a pair of rods 60 and 61. Collector electrode 57 is mounted inside grid 58 by a rod 62. Filament 56 is mounted outside grid 58 by a pair of rods 64 and 65 and a tensioning member 66. The nature and operation of the illustrated gauge 54 are well known. The grid 58 is positively biased with respect to filament 56, and the collector electrode 57 is connected to a microammeter (not shown and negatively biased with respect to grid 58. The filament 56 is then heated by means of an electric current. With the structure illustrated, this heating current, as well as the bias potentials for filament 56, collector electrode 57 and grid 58 are supplied through leads 42, terminals 41, leads 50, pins 53, rods 60, 61, 62, 64, 65 and tensioning member 66, respectively. Since the gauge 54 is located in an evacuated space, the heated filament 56 is capable of releasing electrons to grid 58. These electrons ionize gas molecules in the vacuum space. These ionized gas molecules are attracted by the negatively biased collector electrode 57. The degree of ionization in the gauge is a function of the degree of evacuation of the vacuum space, and the current in collector electrode 57 is thus also a function of the degree of evacuation of the vacuum space. This current is conveniently measured by the above-mentioned microammeter, as is well known in the art.

Since the gauge is fully exposed to the vacuum space, it measures the vacuum more readily than a gauge that has its own enclosure and is connected to the vacuum space by tubulation of finite diameter. In addition, bakeout of the gauge elements is also more readily effected if these elements are free rather than enclosed in a small envelope.

In practice, it is frequently desirable to relocate the gauge within the vacuum vessel to a position other than its original location or to modify the positioning of the gauge as the vacuum work proceeds or as the vacuum vessel is put to different uses. With the prior art devices, relocation of the gauge necessitated a relocation of the gauge mounting structure, which was particularly objectionable if the mounting structure extended through the walls of the vacuum vessel.

With the embodiment shown in the drawing, the spacing of the gauge 54 from enclosure 13 can first be adjusted by sliding tube 30 within sleeve 11 while the nut 36 is untightened. If desired, the length of tube 30 as compared to the length of sleeve 11 may be larger than as shown in the drawing, so that the range of adjustability is increased.

By virtue of the articulate joint provided by brackets 44 and 45 and aligned screws 48 and 49, the gauge 54 may then be adjusted in a plane extending parallel to a longitudinal axis through tube 30. If desired, it would also be possible to extend the length of one of the brackets 44 and 45 and to align screws 48 and 49 along an axis that extends at an angle other than a right angle to a longitudinal axis through tube 30. In this case, the position of the gauge would be adjusted in a plane that extends at an angle to a longitudinal axis through tube 30.

After adjustment in either of the planes just mentioned, the position of the gauge may be further adjusted by angular movement of the tube 30. In this manner, a considerable region of the space inside the vacuum vessel can be covered by the gauge without any relocation of sleeve 11 being necessary. After the positioning of tube 30 has been completed, the nut 36 is tightened to provide the above-mentioned hermetic seal between sleeve 11 and tube 30. If the gauge 54 needs to be repaired, it is simply plugged out of the mounting block 47 while the vacuum apparatus is not in operation. Replacement of gauge 54 is also effected in a similarly convenient and simple manner.

It will, of course, be understood that the drawing shows just a preferred embodiment of the invention and that various modifications thereof, within the scope of the invention, are possible, as will be apparent to those skilled in the art.

We claim:
1. Apparaus comprising:
   (a) a vessel having an encloseure for confiining an evacuated space inside thereof, the enclosure defining an opening extending from the inside to the outside of the enclosure;
   (b) a sleeve extending through said opening and having a free end outside of the enclosure, the sleeve having external thread extending over said free end;
   (c) means for connecting and sealing the sleeve to the enclosure;
   (d) a tube slidably mounted in the sleeve and having a first free end located outside the sleeve beyond the free end of the sleeve, and a second free end located inside the enclosure;
   (e) compressible sealing means engaging the sleeve and the tube and being located at the free end of the sleeve;
   (f) a nut threaded on the free end of the sleeve in engagement with said external thread for compressing said compressible sealing means into sealing contact with the sleeve and the tube;
   (g) means connected to the tube for hermetically closing the tube;
   (h) a mounting block supported by said second free end of the tube; and
   (i) a vacuum gauge mounted on the mounting block.

2. Apparatus comprising:
   (a) a vessel having an enclosure for confining an evacuated space inside thereof, the enclosure having an inside surface, an outside surface and an opening extending from the inside to the outside of the enclosure;
   (b) a sleeve extending through said opening and having a rim defining an annular shoulder adjacent the inside surface of the enclosure, and a free end outside of the enclosure, the sleeve having an external thread extending over said free end;
   (c) means for connecting the sleeve to the enclosure and sealing the sleeve at said rim to the enclosure;
   (d) a tube slidably mounted in the sleeve and having a first free end located outside the sleeve beyond the free end of the sleeve, and a second free end located inside the enclosure;
   (e) compressible sealing means engaging the sleeve and the tube and being located at the free end of the sleeve;
   (f) a nut threaded on the free end of the sleeve in engagement with said external thread for compressing said compressible sealing means into sealing contact with the sleeve and the tube;
   (g) means connected to the tube for hermetically closing the tube;
   (h) a mounting block supported by said second free end of the tube; and
   (i) a vacuum gauge mounted on the mounting block.

3. Apparatus comprising:
   (a) a vessel having an enclosure for confining an evacuated space inside thereof, the enclosure having an inside surface, an outside surface and an opening extending from the inside to the outside of the enclosure;
   (b) a sleeve extending through said opening and having a rim defining an annular shoulder adjacent the inside surface of the enclosure, and a free end outside of the enclosure, the sleeve having an external thread extending from adjacent said opening to the free end of the sleeve;
   (c) a compressible sealing member located between the annular shoulder of the sleeve rim and the inside surface of the enclosure;
   (d) a first nut threaded on the sleeve adjacent the outside surface of the enclosure and being in engagement with the external thread on the sleeve for compressing the annular shoulder of the sleeve rim into sealing contact with the compressible sealing member, and the compressible sealing member into sealing contact with the inside surface of the enclosure;
   (e) a tube slidably mounted in the sleeve and having a first free end located outside the sleeve beyond the free end of the sleeve, and a second free end located inside the enclosure;
   (f) compressible sealing means engaging the sleeve and the tube and being located at the free end of the sleeve;
   (g) a second nut threaded on the free end of the sleeve in engagement with said external thread for compressing the compressible sealing means at the free end of the sleeve into sealing contact with the sleeve and the tube;
   (h) means connected to the tube for hermetically closing the tube;
   (i) a mounting block supported by said second free end of the tube; and
   (j) a vacuum gauge mounted on the mounting block.

4. Apparatus comprising:
   (a) a vessel having an enclosure for confining an evacuated space inside thereof, the enclosure defining an opening extending from the inside to the outside of the enclosure;
   (b) a sleeve extending through said opening and having a free end outside of the enclosure, the sleeve having an external thread extending over said free end;
   (c) means for connecting and sealing the sleeve to the enclosure;
   (d) a tube slidably mounted in the sleeve and having a first free end located outside the sleeve beyond the free end of the sleeve, and a second free end located inside the enclosure;

(e) compressible sealing means engaging the sleeve and the tube and being located at the free end of the sleeve;

(f) a nut threaded on the free end of the sleeve in engagement with said external thread for compressing said compressible sealing means into sealing contact with the sleeve and the tube;

(g) means connected to the tube for hermetically closing the tube;

(h) a mounting block supported by said second free end of the tube;

(i) means connected to the mounting block and the tube for pivoting said mounting block for movement about an axis extending substantially at right angles to a longitudinal axis through the tube; and (j) a vacuum gauge mounted on the mounting block.

5. Apparatus comprising:
(a) a vessel having an enclosure for confining an evacuated space inside thereof, the enclosure having an inside surface, an outside surface and an opening extending from the inside to the outside of the enclosure;

(b) a sleeve extending through said opening and having a rim defining an annular shoulder adjacent the inside surface of the enclosure, and a free end outside of the enclosure, the sleeve having an external thread extending from adjacent said opening to the free end of the sleeve;

(c) a compressible sealing member located between the annular shoulder of the sleeve rim and the inside surface of the enclosure;

(d) a first nut threaded on the sleeve adjacent the outside surface of the enclosure and being in engagement with the external thread on the sleeve for compressing the annular shoulder of the sleeve rim into sealing contact with the compressible sealing member, and the compressible sealing member into sealing contact with the inside surface of the enclosure;

(e) a tube slidably mounted in the sleeve and having a first free end located outside the sleeve beyond the free end of the sleeve, and a second free end located inside the enclosure;

(f) compressible sealing means engaging the sleeve and the tube at the free end of the sleeve;

(g) a second nut threaded on the free end of the sleeve in engagement with said external thread for compressing the compressible sealing means at the free end of the sleeve into sealing contact with the sleeve and the tube;

(h) means connected to the tube for hermetically closing the tube;

(i) a mounting block supported by said second free end of the tube; and (j) means connected to the mounting block and the tube for pivoting said mounting block for movement about an axis extending substantially at right angles to a longitudinal axis through the tube.

6. Apparatus comprising:
(a) a vessel having an enclosure for confining an evacuated space inside thereof, the enclosure defining an opening extending from the inside to the outside of the enclosure;

(b) a sleeve extending through said opening and having a free end outside of the enclosure, the sleeve having an external thread extending over said free end;

(c) means for connecting and sealing the sleeve to the enclosure;

(d) a tube slidably mounted in the sleeve and having a first free end located outside the sleeve beyond the free end of the sleeve, and a second free end located inside the enclosure;

(e) compressible sealing means engaging the sleeve and the tube and being located at the free end of the sleeve;

(f) a nut threaded on the free end of the sleeve in engagement with said external thread for compressing said compressible sealing means into contact with the sleeve and the tube;

(g) a vacuum tight terminal disc having electrical terminals extending therethrough and being located at the second free end of the tube;

(h) means connected to the terminal disc and the tube for hermetically sealing the terminal disc to the tube;

(i) electrical leads extending from outside the first free end of the tube to the electrical terminals of the terminal disc;

(j) a mounting block supported by the second free end of the tube, the mounting block carrying a plurality of plug-in terminals electrically connected to the terminals on the terminal disc; and (k) an electrical vacuum gauge having terminal pins releasably plugged in the plug-in terminals carried by the mounting block.

7. Apparatus comprising:
(a) a vessel having an enclosure for confining an evacuated space inside thereof, the enclosure defining an opening extending from the inside to the outside of the enclosure;

(b) a sleeve extending through said opening and having a free end outside of the enclosure, the sleeve having an external thread extending over said free end;

(c) means for connecting and sealing the sleeve to the enclosure;

(d) a tube slidably mounted in the sleeve and having a first free end located outside the sleeve beyond the free end of the sleeve, and a second free end located inside the enclosure;

(e) compressible sealing means engaging the sleeve and the tube and being located at the free end of the sleeve;

(f) a nut threaded on the free end of the sleeve in engagement with said external thread for compressing said compressible sealing means into contact with the sleeve and the tube;

(g) a vacuum tight terminal disc having electrical terminals extending therethrough and being located at the second free end of the tube;

(h) means connected to the terminal disc and the tube for hermetically sealing the terminal disc to the tube;

(i) electrical leads extending from outside the first free end of the tube to the electrical terminals of the terminal disc;

(j) a mounting block supported by the second free end of the tube, the mounting block carrying a plurality of plug-in terminals electrically connected to the terminals on the terminal disc;

(k) means connected to the mounting block and the tube for pivoting the mounting block for movement about an axis extending at an angle to a longitudinal axis through the tube; and (l) an electrical vacuum gauge having terminal pins releasably plugged in the plug-in terminals carried by the mounting block.

8. Apparatus comprising:
(a) a vessel having an enclosure for confining an evacuated space inside thereof, the enclosure having an inside surface, an outside surface and an opening extending from the inside to the outside of the enclosure;

(b) a sleeve extending through said opening and having a rim defining an annular shoulder adjacent the inside surface of the enclosure, and a free end outside of the enclosure, the sleeve having an external thread extending from adjacent said opening to the free end of the sleeve;

(c) a compressible sealing member engaging the annular shoulder of the sleeve rim and the inside surface of the enclosure;
(d) a first nut threaded on the sleeve adjacent the outside surface of the enclosure and being in engagement with the external thread on the sleeve for compressing the annular shoulder of the sleeve rim into sealing contact with the compressible sealing member, and the compressible sealing member into sealing contact with the inside surface of the enclosure;
(e) a tube slidably mounted in the sleeve and having a first free end located outside the sleeve beyond the free end of the sleeve, and a second free end located inside the enclosure;
(f) compressible sealing means engaging the sleeve and the tube at the free end of the sleeve;
(g) a second nut threaded on the free end of the sleeve in engagement with said external thread for compressing the compressible sealing means at the free end of the sleeve into sealing contact with the sleeve and the tube;
(h) a vacuum tight terminal disc having electrical terminals extending therethrough and being located at the second free end of the tube;
(i) means connected to the terminal disc and the tube for hermetically sealing the terminal disc to the tube;
(j) electrical leads extending from outside the first free end of the tube to the electrical terminals of the terminal disc;
(k) a mounting block supported by the second free end of the tube, the mounting block carrying a plurality of plug-in terminals electrically connected to the terminals on the terminal disc; and
(l) an electrical vacuum gauge having terminal pins releasably plugged in the plug-in terminals carried by the mounting block.

9. Apparatus comprising:
(a) a vessel having an enclosure for confining an evacuated space inside thereof, the enclosure defining an opening extending from the inside to the outside of the enclosure;
(b) a sleeve extending through said opening and having a free end outside of the enclosure, the sleeve having an external thread extending over said free end;
(c) means for connecting and sealing the sleeve to the enclosure;
(d) a tube slidably mounted in the sleeve and having a first free end located outside the sleeve beyond the free end of the sleeve, and a second free end located inside the enclosure;
(e) compressible sealing means engaging the sleeve and the tube at the free end of the sleeve;
(f) a nut threaded on the free end of the sleeve in engagement with said external thread for compressing said compressible sealing means into sealing contact with the sleeve and the tube;
(g) a vacuum-tight terminal disc having electrical terminals extending therethrough and being located at the second free end of the tube;
(h) means connected to the terminal disc and the tube for hermetically sealing the terminal disc to the tube;
(i) electrical leads extending from outside the first free end of the tube to the electrical terminals of the terminal disc;
(j) a mounting block supported by the second free end of the tube, the mounting block carrying a plurality of plug-in terminals electrically connected to the terminals on the terminal disc;
(k) means connected to the mounting block and the tube for pivoting the mounting block for movement about an axis extending at an angle to a longitudinal axis through the tube; and
(l) an electrical vacuum gauge having terminal pins releasably plugged in the plug-in terminals carried by the mounting block.

10. A mounting assembly for a vacuum gauge, comprising:
(a) a mounting sleeve having a first end and a second end and an external thread extending to the first end;
(b) a tube mounted and longitudinally slidable in said sleeve, the tube extending throughout the sleeve and having a first end located outwardly beyond the first end of the sleeve and a second end located outwardly beyond the second end of the sleeve;
(c) compressible sealing means engaging the sleeve and the tube at the first end of the sleeve;
(d) a nut threaded on the first end of the sleeve in engagement with the external thread of the sleeve for compressing the sealing means between the sleeve and the tube;
(e) means connected to the tube for hermetically closing the tube; and
(f) a mounting block structurally connected to and supported by the second free end of the tube for mounting the vacuum gauge.

11. A mounting assembly for a vacuum gauge, comprising:
(a) a mounting sleeve having a first end and a second end, an external thread extending from the first end to the vicinity of the second end, and a rim at the second end defining an annular sealing surface facing in the direction of the first end;
(b) a first nut threaded on the sleeve in engagement with said external thread and positioned at a location between the first and second ends of the sleeve;
(c) a sealing ring encompassing said sleeve and being located between said rim and said first nut for contacting said sealing surface;
(d) a tube mounted and longitudinally slidable in the sleeve and having a first end located outwardly beyond the first end of the sleeve and a second end located outwardly beyond the second end of the sleeve;
(e) compressible sealing means engaging the sleeve and the tube at the first end of the sleeve;
(f) a second nut threaded on the first end of the sleeve in engagement with the external thread of the sleeve for compressing the sealing means between the sleeve and the tube;
(g) means connected to the tube for hermetically closing the tube; and
(h) a mounting block supported by the second free end of the tube for mounting the vacuum gauge.

12. A mounting assembly for a vacuum gauge, comprising:
(a) a mounting sleeve having a first end and a second end and an external thread extending to the first end;
(b) a tube mounted and longitudinally slidable in said sleeve and having a first end located outwardly beyond the first end of the sleeve and a second end located outwardly beyond the second end of the sleeve;
(c) compressible sealing means engaging the sleeve and the tube at the first end of the sleeve;
(d) a nut threaded on the first end of the sleeve in engagement with the external thread of the sleeve for compressing the sealing means between the sleeve and the tube;
(e) a means connected to the tube for hermetically closing the tube;
(f) a mounting block supported by the second free end of the tube for mounting the vacuum gauge; and
(g) means connected to the mounting block and to the tube for pivoting the mounting block for movement about an axis extending at an angle to the longitudinal axis of the tube.

13. A mounting assembly for a vacuum gauge, comprising:
(a) a mounting sleeve having a first end and a second end, an external thread extending from the first end to the vicinity of the second end, and a rim at the second end defining an annular sealing surface facing in the direction of the first end;
(b) a first nut threaded on the sleeve in engagement with said external thread and positioned at a location between the first and second ends of the sleeve;
(c) a sealing ring encompassing said sleeve and being located between said rim and said first nut for contacting said sealing surface;
(d) a tube mounted and longitudinally slidable in the sleeve and having a first end located outwardly beyond the first end of the sleeve and a second end engaging outwardly beyond the second end of the sleeve;
(e) compressible sealing means engaging the sleeve and the tube at the first end of the sleeve;
(f) a second nut threaded on the first end of the sleeve in engagement with the external thread of the sleeve for compressing the sealing means between the sleeve and the tube;
(g) means connected to the tube for hermetically closing the tube;
(h) a mounting block supported by the second free end of the tube for mounting the vacuum gauge; and
(i) means connected to the mounting block and the tube for pivoting the mounting block for movement about an axis extending at an angle to the longitudinal axis of the tube.

14. A mounting assembly for an electrical vacuum gauge having terminal pins, comprising:
(a) a mounting sleeve having a first end and a second end and an external thread extending to the first end;
(b) a tube mounted and longitudinally slidable in said sleeve and having a first end located outwardly beyond the first end of the sleeve and a second end outwardly beyond the second end of the sleeve;
(c) compressible sealing means engaging the sleeve and the tube at the first end of the sleeve;
(d) a nut threaded on the first end of the sleeve in engagement with the external thread of the sleeve for compressing the sealing means between the sleeve and the tube;
(e) a vacuum-tight terminal disc having electrical terminals extending therethrough and being located at the second free end of the tube;
(f) means connected to the terminal disc and the tube for hermetically sealing the terminal disc to the tube;
(g) electrical leads extending from outside the first free end of the tube to the terminals of the terminal disc;
(h) a mounting block supported by the second free end of the tube, the mounting block carrying plug-in terminals for receiving the terminal pins of the vacuum gauge; and
(i) means connected to the mounting block and the tube for pivoting the mounting block for movement about an axis extending at an angle to a longitudinal axis of the tube.

15. A mounting assembly for an electrical vacuum gauge having terminal pins, comprising:
(a) a mounting sleeve having a first end and a second end, an external thread extending from the first end to the vicinity of the second end, and a rim at the second end defining an annular sealing surface facing in the direction of the first end;
(b) a first nut threaded on the sleeve in engagement with said external thread and positioned at a location between the first and second ends of the sleeve;
(c) a sealing ring encompassing said sleeve and being located between said rim and said first nut for contacting said sealing surface;
(d) a tube mounted and longitudinally slidable in the sleeve and having a first end located outwardly beyond the first end of the sleeve and a second end located outwardly beyond the second end of the sleeve;
(e) compressible sealing means engaging the sleeve and the tube at the first end of the sleeve;
(f) a second nut disposed on the first end of the sleeve in engagement with the external thread of the sleeve for compressing the sealing means between the sleeve and the tube;
(g) a vacuum-tight terminal disc having electrical terminals extending therethrough and being located at the second free end of the tube;
(h) means connected to the terminal disc and the tube for hermetically sealing the terminal disc to the tube;
(i) electrical leads extending from outside the first free end of the tube to the terminals of the terminal disc;
(j) a mounting block supported by the second free end of the tube, the mounting block carrying plug-in terminals for receiving the terminal pins of the vacuum gauge; and
(k) means connected to the mounting block and the tube for pivoting the mounting block for movement about an axis extending at an angle to a longitudinal axis of the tube.

16. A mounting assembly for a vacuum gauge, comprising:
(a) a mounting sleeve having a first end and a second end opposite said first end;
(b) a tube mounted and longitudinally slidable in the mounting sleeve and hermetically sealable thereto, the tube extending throughout the sleeve and having a first end located beyond the first end of the sleeve and a second end located beyond the second end of the sleeve;
(c) means for mounting the vacuum gauge, including a mounting block having means for structurally supporting the vacuum gauge, and means defining an articulate joint connected to the second end of the tube and to the mounting block and structurally supporting the mounting block for swinging movement of the mounting block relative to the tube.

References Cited by the Examiner

UNITED STATES PATENTS

| | | | |
|---|---|---|---|
| 2,000,545 | 5/1935 | Wolarsky | 174—62 X |
| 2,037,949 | 4/1936 | Tate | 73—388 |
| 2,475,787 | 6/1949 | Kelsay | 174—65 X |
| 2,594,212 | 4/1952 | Proudfoot | 250—83.6 |
| 2,816,949 | 12/1957 | Curtiss | 174—51 |
| 2,856,451 | 10/1958 | Appleton | 285—161 X |

FOREIGN PATENTS 916,224   1/1963   Great Britain.

ROBERT K. SCHAEFER, *Primary Examiner.*

JOHN F. BURNS, *Examiner.*

WILLIAM B. FREDERICKS, JOSEPH F. RUGGIERO,
*Assistant Examiners.*